United States Patent [19]

Ahlisch et al.

[11] 4,067,602
[45] Jan. 10, 1978

[54] GRIP ATTACHMENT FOR VEHICLES

[75] Inventors: Hans-Dieter Ahlisch, Sindelfingen; Rolf Amann, Renningen; Franz Bald; Gerhard Dostal, both of Sindelfingen; Alfred Folster, Boblingen; Wolfgang Schleh, Sindelfingen; Gunther Kachele, Sindelfingen; Rolf Kowallek, Sindelfingen; Helmut Schnaufer, Sindelfingen, all of Germany

[73] Assignee: Daimler-Benz Aktiengesellschaft, Germany

[21] Appl. No.: 598,228

[22] Filed: July 23, 1975

[30] Foreign Application Priority Data

July 24, 1974 Germany .............................. 2435544

[51] Int. Cl.² ............................................... B60N 3/02
[52] U.S. Cl. ...................................... 296/71; 105/354; 312/320
[58] Field of Search .......................... 246/71; 280/181; 105/354; 16/125, 119, 110 R; 312/320

[56] References Cited

U.S. PATENT DOCUMENTS 3,183,549  5/1965  Hammesfahr ........................ 16/125

FOREIGN PATENT DOCUMENTS 1,173,416  10/1958  France .................................. 296/71
2,402,505   7/1975  Germany ............................. 296/71
  216,172  10/1967  Sweden ................................ 296/71

Primary Examiner—Joseph F. Peters, Jr.
Assistant Examiner—John A. Carroll
Attorney, Agent, or Firm—Craig & Antonelli

[57] ABSTRACT

A fastening arrangement for a handle strip consisting of band-shaped high tensile material at an inner sheet metal wall of a motor vehicle passenger space by a clamping-type fastener, whereby a form-lockingly interengaging connection preventing rotation or twisting of the handle fastening arrangement about the clamping-type fastener is provided between the handle strip end and the sheet metal wall; the protection against rotation or twisting is thereby constructed in the form of a trough-like fastening recess pressed-out in the sheet metal wall, which extends in the longitudinal direction of the handle strip, corresponds approximately to the strip width and has at least approximately parallel side walls; the end of the handle strip serving the fastening purpose is inserted into the recess and is fastened therein.

44 Claims, 7 Drawing Figures

GRIP ATTACHMENT FOR VEHICLES

The present invention relates to a fastening arrangement of a gripping or holding handle for motor vehicles which consists, as regards its loadbearing part, of a band-shaped, high tensile bar or strip (handle strip) disposed with its two ends serving the purposes of fastening essentially parallel to the wall and preferably made of steel band material, at an inner sheet metal wall of the vehicle passenger space by means of one clamping fastening means extending through the handle bar or strip and through the sheet metal wall (clamp-type fastening device), especially by means of a screw or bolt at each handle end, whereby there is provided within the fastening area, in addition to each clamp-type fastening device, a form-lockingly interengaging connection between the handle strip and the sheet metal wall which at least in cooperation with the clamp-type fastening device prevents a rotation or twisting of the handle fastening arrangement about the clamping fastening means.

Known handle attachments of this type, as disclosed, for example, in the German Gebrauchsmuster No. 7,231,674 are still not yet sufficiently stable and sturdy and may become loose in due time by reason of a certain yieldingness.

It is the aim of the present invention to reinforce the handle fastening arrangement with means which are as simple as possible and above all are inexpensive as regards manufacture and assembly so that it will satisfy the requirements of the practice also over long periods of time.

The underlying problems are solved according to the present invention in that the rotation-protection, i.e., the structural feature protecting against rotation or twisting, is constructed in the form of a trough-like stamped-in or punched-in portion (fastening trough or fastening recess) extending in the longitudinal direction of the handle strip or bar, corresponding to the strip width and provided with at least approximately parallel side walls, into which the respective end of the handle strip serving the fastening purpose is inserted and is secured therein.

Consequently, a corresponding surface configuration of the sheet metal wall, at which the handle is to be fastened, is incorporated in the handle fastening means and in the rotation-protection, and a form-locking protection against rotation or twisting is created which far-reachingly relieves the threaded connection from any transverse forces. The fastening recess or trough has the advantage as a large-surface form-locking element compared to other smaller form-locking elements that—as long as it is not yet visible underneath a covering or fabric prior to the handle installation—it can be found more readily by means of the handle itself and without the need of prior searching or detection by means of the fingers, and the handle can be pressed in with its fastening ends eventually with slight corrections. Particularly in the large series or mass production, the rapid and exact finding and locating of the correct relative position of the parts to be assembled or installed is particularly important.

In order to obtain a base against torsion or rotation which is as wide as possible, and also in order to far-reachingly relieve the fastening ends of the handle strip against tearing-off forces and against bulgings which might lift out the fastening end out of the form-locking recess, it is appropriate if the clamping fastening means is arranged as close as possible to the transition area of the end serving the fastening of the handle strip in the bow-like handle strip offset.

In order to attain a form-locking connection between the fastening ends of the handle strip and the fastening recess which is as free of play as possible, it is appropriate if at least the two side flanks of the fastening recess disposed parallel to the handle strip are provided with an inclination that opens toward the outside. As a result of the tightening of the clamping fastening means, the handle strip is pressed in between the inclined flanks of the fastening recess.

The fastening places of the handle are normally covered off by decorative caps. In order to be able to constitute this covering as simple as possible, provision may be made that the fastening recess is punched-in to a depth corresponding approximately to the height of the head of the clamping fastening means plus the strip thickness and in that the decorative cap is constructed in the form of at least an approximately flat cover surrounding the handle body with an opening and covering the fastening recess. In order to secure the decorative cover in the installed position, there are provided, in addition to the clamping fastening means, one aperture or opening each in the end serving the fastening of the handle strip and in the sheet metal wall and at the decorative cover, one corresponding fastening dowel pin at the place of the openings which is adapted to engage into the apertures or openings. In order to be able to compensate readily relative positional tolerances between the handle end and the handle recess, it is advantageous if the dowel pin aperture or opening in the handle strip end is somewhat smaller than the corresponding aperture or opening in the sheet metal wall. The fastening dowel pin is then retained in the handle strip end against any pulling-out primarily at the edge of the opening. For the most part, the handles are threadably secured through a fabric covering or the like, covering the fastening place and the handle area. In order to be able to facilitate the penetration of the dowel pin through this covering without pre-existing holes therein, it is advantageous if the free end of the fastening dowel pin is constructed with a sharp-edged point.

The handle strips are provided with a hose-like enclosure or casing for protective purposes and also in order that the grip becomes more voluminous and more appealing. In order that this hose-like enclosure or casing need not be fashioned and shaped in a particular manner at the ends, yet the end-face end can be securely covered off about its entire circumference, it is appropriate if the fastening recess is constructed within the area of the transition of the fastening end into the handle bow at least approximately as wide as the hose-like enclosure and in the direction toward the handle bow interior longer than the fastening end by an amount corresponding to the enclosure or casing thickness.

In order to render the fastening recess particularly stable and rigid against torsional forces within the fastening area of the handle, it may be appropriate to constitute the depth of the fastening recess only so slight that it corresponds to more than the thickness of the handle strip but is less than twice the thickness of the handle strip. With such flat fastening recesses, the handle strip may again be offset or cranked at the outermost end out of the fastening recess and approximately parallel to the sheet metal wall. This cranking or offset offers various possibilities of a fastening of an otherwise constructed decorative cap. More particularly, the decorative cap slipped over the handle body may be clipped-on at the outermost cranked-off or offset handle strip end by means of a barb-like nose. Another possibility for the covering of the handle fastening may advantageously reside in that the handle strip is provided with a circumferentially extending subsequently applied injection-molded or extruded profile which adjoins the enclosure or casing and leaves open the bottom side immersing into the fastening recess and the side flanks of the handle strip and the immediate area of the clamping fastening means. The aperture or recess for the bolt head is adapted to be closed off by means of a cover adapted to be clipped in at the edge and closing flush with the surface. This cover, in its turn, may be connected to be safe against loss and adapted to be readily seized during installation with the edge of the aperture or recess at the molded-on or sprayed-on profile by way of a film hinge.

Accordingly, it is an object of the present invention to provide a handle fastening arrangement for motor vehicles which avoids by simple means the aforementioned shortcomings and drawbacks encountered in the prior art.

Another object of the present invention resides in a handle fastening for vehicles which assures sufficient stability and reliability of operation even over long periods of time.

A further object of the present invention resides in a handle attachment of the type described above which is as simple as possible and involves relatively inexpensive means as regards manufacture and installation.

A still further object of the present invention resides in a handle fastening arrangement for vehicles in which the threaded connections thereof are far-reachingly relieved of transverse forces.

Still another object of the present invention resides in a handle fastening structure which can be readily installed, even in places where not visible due to the existence of a fabric covering or the like.

Another object of the present invention resides in a handle fastening which permits a rapid and accurate location of the relative position of the parts to be assembled.

A further object of the present invention resides in a handle fastening arrangement for motor vehicles which is characterized by greatly improved stress conditions in the connections between the parts.

These and further objects, features and advantages of the present invention will become more apparent from the following description when taken in connection with the accompanying drawing which shows, for purposes of illustration only, several embodiments in accordance with the present invention, and wherein.

Figure 1:
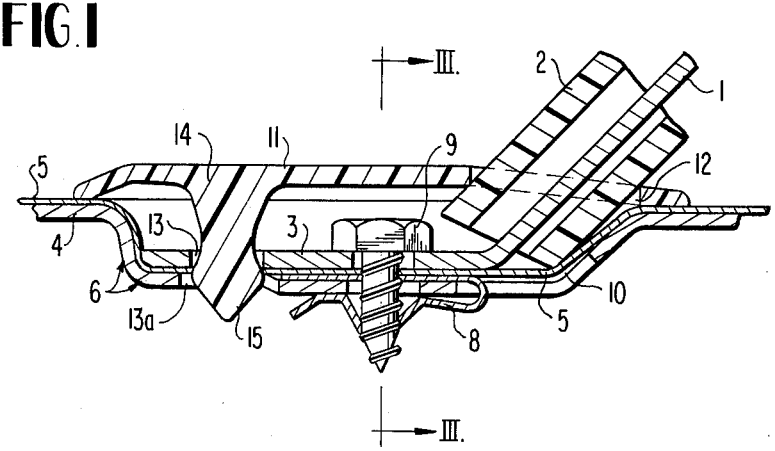
FIG. 1 is a cross-sectional view of a first embodiment of a handle fastening arrangement in accordance with the present invention, taken along the I—I of FIG. 2.
Figure 2:
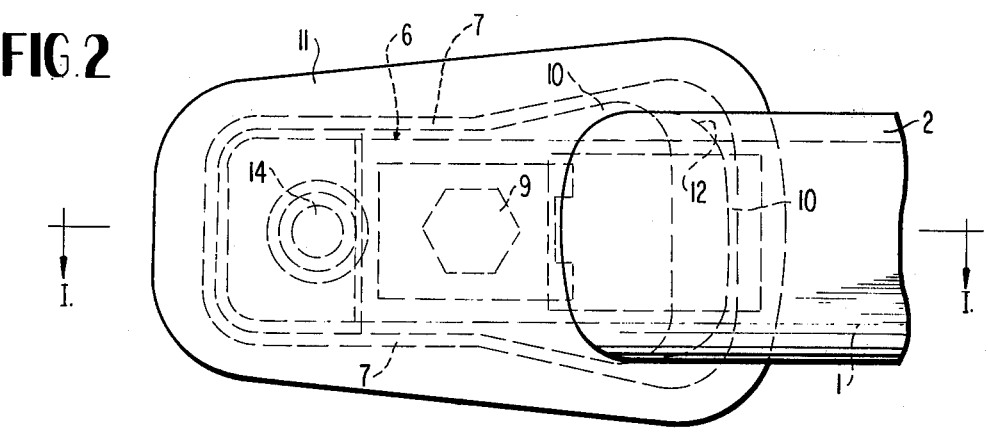
FIG. 2 is a top plan view on the handle fastening arrangement of FIG. 1.
Figure 3:
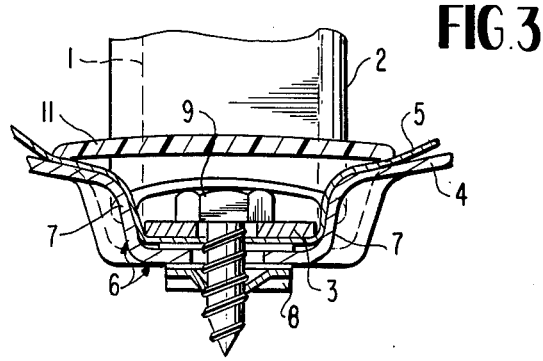
FIG. 3 is a cross-sectional view taken along line III—III of FIG. 1.

Referring now to the drawing wherein like reference numerals are used throughout the various views to designate like parts, and more particularly to FIGS. 1 to 3, in the first embodiment of a handle fastening arrangement illustrated in these figures, the holding or gripping handle shown only in part consists of a handle bar or strip 1 made of steel and having a hose-like casing or envelope 2 which serves the beautification, padding and the protection, and of the cranked or offset fastening ends 3 of the handle strip 1 which are attached at both ends thereof in the manner to be described more fully hereinafter. As shown also in FIG. 1, the fastening ends 3 are not surrounded by the casing or envelope 2 which stops short of the fastening ends 3. The handle is fastened at a vehicle wall 4 which is covered with a web 5, for example, a fabric web.

A trough-like fastening recess generally designated by reference numeral 6, corresponding to the width of the strip 1 and having steeply inclined side flanks 7 (FIG. 3) is stamped or pressed into the wall 4. The fastening ends 3 can be easily, rapidly and positionally accurately pressed-in into the troughlike recess 6 for purposes of the handle installation, which together with the side flanks 7 produce a good rotation-protection against twisting or rotation of the fastening end 3. A threaded connection consisting of a sheet metal nut 8 and a sheet metal bolt 9 is mounted in the fastening end in proximity of the transition place of the fastening end 3 into the remaining part of the handle strip 1, which absorbs the tearing-off forces of the handle. By tightening the threaded connection, the fastening end 3 is pressed against the bottom of the stamped-in portion 6 which tapers or becomes narrower in width in the downward direction of the recess so that a flush abutment of the side edges of the fastening end 3 at the side flanks 7 and therewith a play-free protection against rotation and twisting is attained thereby. The stamped-in or pressed-in recess 6 is so deep in the embodiment according to FIGS. 1 to 3, that the bolt head of bolt 9 disappears completely therein. Within the area of the transition place of the fastening end 3 into the handle, properly speaking, the stamped-in recess portion is wider than the handle 1 (FIG. 2), thus leaving free spaces 10 so that the casing or enclosure 2 can extend up to nearly the bottom of the stamped-in or pressed-in portion 6 and can be cut off obtusely (FIG. 1), i.e., without one-sided decorative bar or the like. Owing to the depth of the pressed-in recess portion 6, the handle fastening can be covered off by a simple, nearly flat cover 11 (FIGS. 1 and 3) extending over the pressed-in portion 6. The cover 11, in its turn, is secured, on the one hand, by means of an aperture 12 (FIGS. 1 and 2) surrounding the handle and, on the other, by a dowel pin 14 extending through a bore or aperture 13 and 13a provided, respectively, in the handle end 3 and in the bottom of the pressed-in recess portion 6. The free dowel pin end is constructed sharp-edged and with a point 15 (FIG. 1) so that it can penetrate through the covering 5 at the apertured place without auxiliary means solely by a simple blow with the edge of the hand or with the screwdriver shank.

Figure 4:
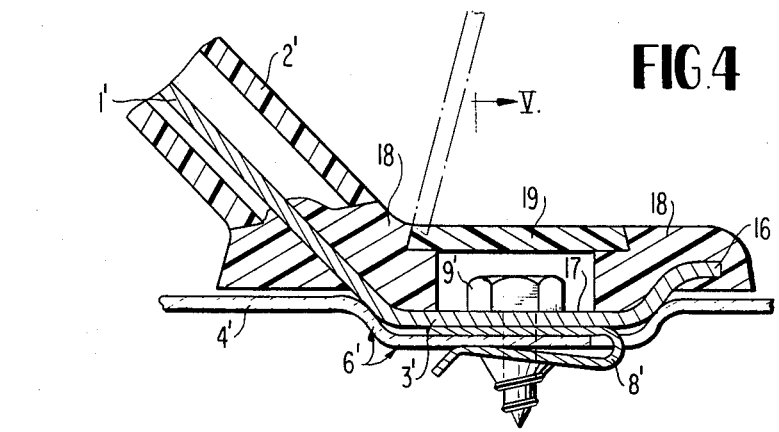
FIG. 4 is a cross-sectional view, similar to FIG. 1, through a modified embodiment of a handle fastening arrangement in accordance with the present invention.
Figure 5:
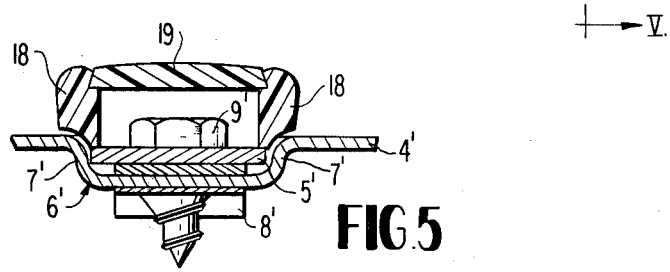
FIG. 5 is a cross-sectional view through the handle fastening arrangement of FIG. 4, taken along line V—V of FIG. 4.
Figure 6:
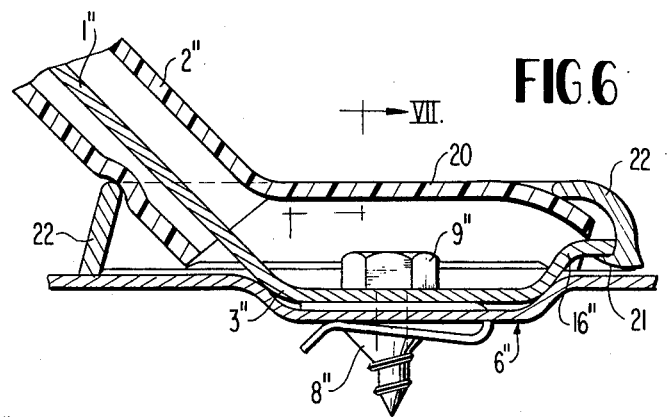
FIG. 6 is a cross-sectional view, similar to FIGS. 1 and 4, through a third embodiment of a handle fastening arrangement in accordance with the present invention.
Figure 7:
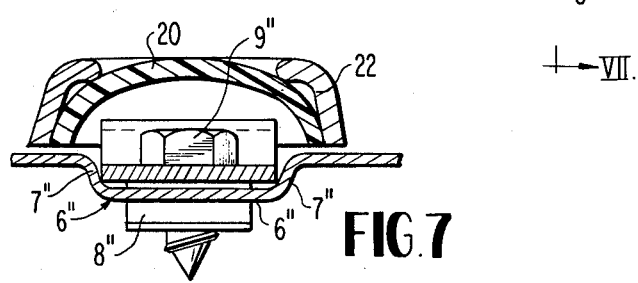
FIG. 7 is a cross-sectional view through the handle fastening arrangement of FIG. 6, taken along line VII—VII of FIG. 6.

The preceding description is applicable as regards the corresponding parts also for the embodiments of handle fastening arrangements illustrated in FIGS. 4 and 5 as well as in FIGS. 6 and 7, whence the same parts are designated therein by the same reference numerals while similar parts are designated therein by corresponding primed and double-primed reference numerals. The following description is therefore limited to the illustration of the differences in the various embodiments.

The stamped-in or pressed-in recess portion 6' for the handle fastening arrangement illustrated in FIGS. 4 and 5 is less deep than that in FIGS. 1 to 3; it is therefore more stable against rotation or twisting. The stamped-in or pressed-in recess portion 6' corresponds according to length and width to the fastening end 3'. However, a side bar or lug 16 projecting out of the pressed-in portion 6' and serving the purpose of fastening the covering is cranked off or offset at the fastening end 3'. The fastening ends 3' and the lug 16 are covered on all sides by a molded or extruded profile member or fastening cover 18 of any suitable synthetic resinous material, except for the part of the fastening end 3' projecting into the stamped-in or pressed-in recess portion 6' and for the bolt head abutment 17; a cover 19 adapted to be clipped in is secured at the fastening cover 18 by way of a so-called film-hinge in order to provide a flush covering of the bolt head opening.

In the handle fastening arrangement according to FIGS. 6 and 7, the pressed-in or stamped-in trough-like recess portion 6" is also less deep and is matched accurately to the fastening end 3" according to width and length. Also the cranked-off or offset lug 16" for the decorative cap fastening is present in this embodiment. The covering of the threaded connection, however, is constructed differently. More particularly, the hose-like casing or enclosure 2" is cut off so unevenly that a decorative side bar or lug 20 remains on the top side which covers the fastening arrangement. The sides of the fastening arrangement are covered off by a decorative cap 22 which, on the one hand, is elastically supported at the hose-like casing 2" along the handle bottom side and, on the other side, is retained at the tongue 16" by means of a clip-like nose portion 21.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a fastening arrangement for a handle at an inner wall structure of a vehicle passenger space, wherein said handle includes a body portion and end portions, said fastening arrangement comprising
   fastening means for securing at least one of said end portions of said handle to said inner wall structure, and
   connecting means for preventing rotation of said handle with respect to said fastening means, said connecting means including recess means arranged within said inner wall structure and extending essentially in the longitudinal direction of said handle for receiving said at least one end portion, said fastening means securing said end portions within said recess means.

2. A handle fastening arrangement according to claim 1, characterized in that the handle includes a handle strip means with two ends, each serving for fastening purposes, and each being disposed essentially parallel to said inner wall structure.

3. A handle fastening arrangement according to claim 2, characterized in that the handle strip means consists of a band-shaped high tensile strength strip material.

4. A handle fastening arrangement according to claim 1, characterized in that the handle includes a steel band.

5. A handle fastening arrangement according to claim 2, characterized in that the fastening means includes a clamping fastening means.

6. A handle fastening arrangement according to claim 5, characterized in that the fastening means consists of clamping fastening means extending through the handle strip means and the inner wall structure.

7. A handle fastening arrangement according to claim 5, characterized in that the fastening means includes only one bolt at each end.

8. A handle fastening arrangement according to claim 5, characterized in that the recess means is constructed as a trough-like, pressed-in portion in said inner wall structure extending in the longitudinal direction of the handle strip means and corresponding to approximately the width of the handle strip means.

9. A handle fastening arrangement according to claim 8, characterized in that the recess means includes at least approximately parallel side walls.

10. A handle fastening arrangement according to claim 9, characterized in that the fastening means is arranged close to a transition area of the end of the handle into an arcuate offset portion of the handle body portion.

11. A handle fastening arrangement according to claim 10, characterized in that at least the two side walls of the recess means disposed at least approximately parallel to the handle strip means are provided with an outwardly opening inclination.

12. A handle fastening arrangement according to claim 11, wherein a decorative cap means covers the fastening area, characterized in that the recess means is pressed in to a depth corresponding approximately to the height of the head of the clamping fastening means plus the strip thickness, and in that the decorative cap means is constructed in the form of at least an approximately flat cover means surrounding the handle body portion with an opening and covering the recess means.

13. A handle fastening arrangement according to claim 12, characterized in that in addition to the clamping fastening means, one aperture means is provided through each end serving for fastening the handle strip means and through the inner wall structure, and in that a fastening pin means is provided at the decorative cover means at the location of the aperture means to engage into the aperture means.

14. A handle fastening arrangement according to claim 13, characterized in that the pin means is a dowel pin.

15. A handle fastening arrangement according to claim 13, characterized in that the aperture means through the handle strip end is slightly smaller than the corresponding aperture means through the inner wall structure.

16. A handle fastening arrangement according to claim 15, characterized in that the free end face of the fastening pin means is constructed sharp-edged with a point.

17. A handle fastening arrangement according to claim 15, wherein a hose-like casing means is disposed about the handle strip means, characterized in that the recess means is at least approximately as wide as the hose-like casing means at said transition area of the end at the handle body portion, and said recess means is constructed longer at the transition area than at the fastening end to provide free space about said casing means.

18. A handle fastening arrangement according to claim 11, characterized in that the depth of the recess means corresponds to more than the thickness of the handle strip means but less than twice the thickness thereof.

19. A handle fastening arrangement according to claim 18, characterized in that the handle strip means, at the outermost end thereof, has a tip portion extending out of the recess means and approximately parallel to the inner wall structure.

20. A handle fastening arrangement according to claim 19, characterized in that the tip portion at the outermost end of the handle strip means forms a retaining tongue portion.

21. A handle fastening arrangement according to claim 20, characterized in that a decorative cap means placed with an aperture means over the handle body portion is clipped on by said tip portion forming the retaining tongue portion of a barb-like nose portion.

22. A handle fastening arrangement according to claim 18, wherein a hose-like casing means surrounds the handle strip means within an area away from the inner wall structure, characterized in that the handle strip means is provided with a subsequently applied profile means adjoining the casing means, said profile means having an opening over the recess means and immediate area of the clamping fastening means.

23. A handle fastening arrangement according to claim 22, characterized in that the opening over the clamping fastening means is adapted to be closed off by means of a cover means flush with the surface of said profile means and adapted to be clipped in at the edge of the opening for the clamping fastening means.

24. A handle fastening arrangement according to claim 23, characterized in that the cover means is connected with the edge of the opening at the profile means by way of a film hinge.

25. A handle fastening arrangement according to claim 5, wherein a decorative cap means covers the fastening area, characterized in that the recess means is pressed in to a depth corresponding approximately to the height of the head of the clamping fastening means plus the strip thickness, and in that the decorative cap means is constructed in the form of at least an approximately flat cover means surrounding the handle body portion with an opening and covering the recess means.

26. A handle fastening arrangement according to claim 25, characterized in that in addition to the clamping fastening means, one aperture means is provided through each end of the handle strip means and through the inner wall structure for fastening the decorative cap means to the inner wall structure, and in that a fastening pin means is provided at the decorative cap means at the location of the aperture means to engage into the aperture means.

27. A handle fastening arrangement according to claim 26, characterized in that the aperture means through the handle strip end is slightly smaller than the corresponding aperture means through the inner wall structure.

28. A handle fastening arrangement according to claim 26, characterized in that the free end face of the fastening pin means is constructed sharp-edged with a point.

29. A handle fastening arrangement according to claim 2, wherein a hose-like casing means is disposed about the handle strip means, characterized in that the recess means is at least approximately as wide as the hose-like casing means at a transition area of the handle end portion with the handle body portion, and said recess means is constructed longer at the transition area than at the fastening end to provide free space about said casing means.

30. A handle fastening arrangement according to claim 2, characterized in that the depth of the recess means corresponds to more than the thickness of the handle strip means but less than twice the thickness thereof.

31. A handle fastening arrangement according to claim 2, characterized in that the handle strip means, at the outermost end thereof, has a tip portion extending out of the recess means and approximately parallel to the inner wall structure.

32. A handle fastening arrangement according to claim 31, characterized in that a decorative cap means placed with an aperture means over the handle body portion is clipped on by said tip portion forming a barb-like nose portion.

33. A handle fastening arrangement according to claim 2, characterized in that the recess means includes at least approximately parallel side walls.

34. A handle fastening arrangement according to claim 33, wherein a hose-like casing means surrounds the handle strip means within an area away from the inner wall structure, characterized in that the handle strip means is provided with a subsequently applied profile means adjoining the casing means, said profile means having an opening over the recess means and immediate area of the fastening means.

35. A handle fastening arrangement according to claim 34, characterized in that the opening over the fastening means is adapted to be closed off by means of a cover means flush with the surface of said profile means and adapted to be clipped in at the edge of the opening for the fastening means.

36. A handle fastening arrangement according to claim 1, wherein cover means are disposed over said recess means, said cover means providing an enclosed space about said fastening means.

37. A handle fastening arrangement according to claim 36, wherein said cover means includes a flat covering member having an opening to accommodate said handle body portion, characterized in that said end portion of said handle and said inner wall structure include aperture means through which a fastening pin member secured to said flat covering member extends.

38. A handle fastening arrangement according to claim 36, wherein said cover means includes a profiled member adjoining said handle body portion and having an aperture over said fastening means, characterized in that said aperture is adapted to be closed by a hinged member.

39. A handle fastening arrangement according to claim 36, wherein said cover means includes an extended surface portion of said handle body portion and a cap member surrounding said extended surface portion, characterized in that said cap member is retained by a tip member of said handle end portion.

40. A handle fastening arrangement according to claim 1, wherein said fastening means includes only one bolt at each end portion of said handle.

41. A handle fastening arrangement according to claim 40, wherein said recess means is constructed as a trough-like recess portion pressed into said inner wall structure, said recess portion having a width corresponding to the width of said end portions of said handle.

42. A handle fastening arrangement according to claim 40, wherein said inner wall structure is a sheet metal vehicle wall.

43. A handle fastening arrangement according to claim 1, wherein said recess means is constructed as a trough-like recess portion pressed into said inner wall structure, said recess portion having a width corresponding to the width of said end portions of said handle.

44. A handle fastening arrangement according to claim 1, wherein said inner wall structure is a sheet metal vehicle wall.

* * * * *